United States Patent
Dölves

(10) Patent No.: US 6,283,019 B1
(45) Date of Patent: Sep. 4, 2001

(54) METHOD FOR ENGRAVING PRINTING CYLINDERS

(75) Inventor: Jürgen Heinrich Fritz Dölves, Heikendorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/424,753

(22) PCT Filed: May 27, 1998

(86) PCT No.: PCT/DE98/01444

§ 371 Date: Apr. 28, 2000

§ 102(e) Date: Apr. 28, 2000

(87) PCT Pub. No.: WO98/55301

PCT Pub. Date: Dec. 10, 1998

(30) Foreign Application Priority Data

Jun. 2, 1997 (DE) .............................................. 197 23 007
Aug. 2, 1997 (DE) .............................................. 197 33 442

(51) Int. Cl.$^7$ ............................................................ B41F 1/07
(52) U.S. Cl. .................. 101/32; 101/485; 101/401.1; 409/108; 409/109; 358/299; 364/474.02
(58) Field of Search ......................... 101/3.1, 32, 483, 101/485, 401.1; 358/477, 478, 298, 299, 456, 458; 409/108, 109; 364/474.02, 474.32, 474.35, 474.37; 356/378, 379

(56) References Cited

U.S. PATENT DOCUMENTS

| | | | |
|---|---|---|---|
| 4,174,527 | * 11/1979 | Schaefer | 358/299 |
| 4,259,697 | * 3/1981 | Doelves | 358/299 |
| 4,729,037 | * 3/1988 | Doelves | 358/299 |
| 5,492,057 | 2/1996 | Bornhors, Jr. et al. . | |
| 5,532,731 | 7/1996 | Mihara et al. . | |
| 5,663,802 | * 9/1997 | Beckett et al. | 358/299 |
| 5,808,748 | * 9/1998 | Brewer et al. | 358/299 |
| 5,828,464 | * 10/1998 | Yoshida et al. | 358/299 |
| 5,831,746 | * 11/1998 | Seltz et al. | 358/299 |
| 5,894,354 | * 4/1999 | Beckett et al. | 358/299 |
| 5,947,020 | * 9/1999 | Bornhorst, Jr. et al. | 101/32 |
| 6,007,230 | * 12/1999 | Beckett et al. | 364/474.02 |
| 6,025,921 | * 2/2000 | Beckett et al. | 358/299 |

FOREIGN PATENT DOCUMENTS 0 762 723 3/1997 (EP) .
WO 95/08443 3/1995 (WO) .

* cited by examiner

Primary Examiner—Eugene Eickholt
(74) Attorney, Agent, or Firm—Schiff Hardin & Waite

(57) ABSTRACT

In a method for engraving printing cylinders for rotogravure in an electronic engraving machine, at least two engraving lanes with predetermined lane widths lying side-by-side in an axial direction of the printing cylinder are engraved with a respectively allocated engraving element. Before the engraving, an axial reference position is predetermined for each engraving element, the axial spacings thereof relative to one another corresponding to the predetermined lane widths of the engraving lanes. The engraving elements are roughly positioned to their reference positions. Subsequently, the axial spacing errors between the reference positions and the actual position of the engraving element the rough positions are measured. During engraving, the engraving elements are moved along the printing cylinder with the faulty spacings relative to one another caused by their rough positioning. The spacing errors are compensated by a shifted engraving of the engraving lanes on the printing cylinder such that the engraving lanes exhibit the predetermined lane widths despite the incorrect spacings of the engraving elements relative to one another.

34 Claims, 4 Drawing Sheets

METHOD FOR ENGRAVING PRINTING CYLINDERS

BACKGROUND OF THE INVENTION

The invention is in the field of electronic reproduction technology and is directed to a method for engraving printing cylinders for rotogravure, whereby at least two engraving lanes of predetermined lane widths lying next to one another in axial direction are engraved with a respectively allocated engraving element, and is also directed to an electronic engraving machine for the implementation of the method.

When engraving printing cylinders in an electronic engraving machine, the engraving element that, for example, comprises an engraving stylus as a cutting tool, moves axially along a rotating printing cylinder continuously or in steps. The engraving stylus controlled by an engraving control signal cuts a sequence of depressions, referred to below as cups, arranged in an engraving raster into the generated surface of the printing cylinder. The engraving control signal is formed from the superimposition of an engraving signal representing the tonal values between "black" and "white" with a periodic raster signal. Whereas the periodic raster signal effects a vibrating lifting motion of the engraving stylus, the engraving signal controls the depths of the cups engraved into the generated surface of the printing cylinder in conformity with the tonal values to be reproduced.

For magazine printing, a plurality of strip-shaped cylinder regions, called engraving lanes, that lie axially next to one another must be simultaneously engraved with a respective engraving element on a printing cylinder or, respectively, on the printing cylinders of a color set that are successively engraved in one engraving machine or, on the other hand, are engraved simultaneously in a plurality of engraving machines. For example, the various printed pages of a print job are engraved in the individual engraving lanes. The engraving elements allocated to the individual engraving lanes are mounted on a common engraving carriage that moves along the printing cylinder in an axial direction during engraving.

A prerequisite for a good reproduction quality is the registration-exact adherence to the lane widths of the individual engraving lanes in the axial direction of the printing cylinder. In order to achieve a registration-exact engraving of the engraving lanes, the distances between the engraving stylus tips of the individual engraving elements in the axial direction of the printing cylinder due to axial displacement of the engraving elements on the engraving carriage must be set with high precision to the required lane widths according to the traditional method, and the engraving carriage with the exactly spaced engraving elements must then be displaced relative to the printing cylinder such that the engraving stylus tips are positioned to the respective, axial engraving start position of the engraving lanes. It is thereby not so much a matter of the absolute setting of the lane widths within an allowable range of tolerances but that all lane widths on a printing cylinder exactly coincide within the range of tolerance.

The traditional alignment of the engraving stylus tips of the engraving elements to the lane widths to be engraved occurs essentially manually by an operator in that the operator initially roughly sets the spacings of the engraving elements corresponding to the lane widths and then finely positions the engraving stylus tips of the engraving elements with visual observation of the engraving stylus tips with the assistance of a specific microscope unit (stylus allocation gauge) and manually actuatable spindle drives.

This manual procedure is time-consuming, particularly when a great number of engraving lanes are to be positioned and, thus, a great plurality of engraving elements must be positioned. Moreover, the adjustment precision is essentially dependent on the care of the operator.

WO Published Application 95/21332 already discloses an apparatus for automatic, axial positioning of a plurality of engraving elements when engraving printing cylinders with the assistance of motor drives for the individual engraving elements arranged on an engraving carriage and a sensor monitoring for the automatic motion sequences.

SUMMARY OF THE INVENTION

An object of the present invention is to improve a method for engraving printing cylinders for rotogravure, whereby at least two engraving lanes with predetermined lane widths lying side-by-side in the axial direction are engraved with a respectively allocated engraving element, to improve an electronic engraving machine for implementation of the method, as well as to improve a position measuring unit such that exact, manual or automatic settings of the axial spacings of the engraving elements relative to one another are no longer required in order to achieve a good engraving quality.

According to the method of the invention for engraving printing cylinders for a rotogravure and an electronic engraving machine, at least two engraving lanes with predetermined lane widths are provided lying next to one another in an axial direction of the printing cylinder. The engraving elements respectively engrave a sequence of cups arranged in an engraving raster into the rotating printing cylinder. Engraving control signals for drive of the engraving elements are formed by superimposition of engraving signals that represent tonal values to be engraved with a periodic raster signal for generating a raster. For engraving the cups, the engraving elements execute a feed motion along the printed cylinder in the axial direction of the printing cylinder. Before engraving, axial spacings of the engraving elements are set relative to one another. An axial reference position is predetermined for each engraving element, axial spacings of the reference positions relative to one another corresponding to the predetermined lane widths of the engraving lanes. The engraving elements are roughly positioned to their reference positions. Axial spacing errors between the reference positions and actual positions of the engraving elements based on the rough positioning are measured. During engraving, the engraving elements execute a feed motion along the printing cylinder with faulty spacings relative to one another caused by the rough positioning. The axial spacing errors are compensated by a shifted engraving of the engraving lanes on the printing cylinder such that the engraving lanes exhibit the predetermined lane widths despite the faulty spacings of the engraving elements relative to one another.

The invention is explained in greater detail below with reference to FIGS. 1 through 4.

BRIEF DESCRIPTION OF THE DRAWINGS

Shown are.

DESCRIPTION OF THE PREFERRED EMBODIMENTS

Figure 1:
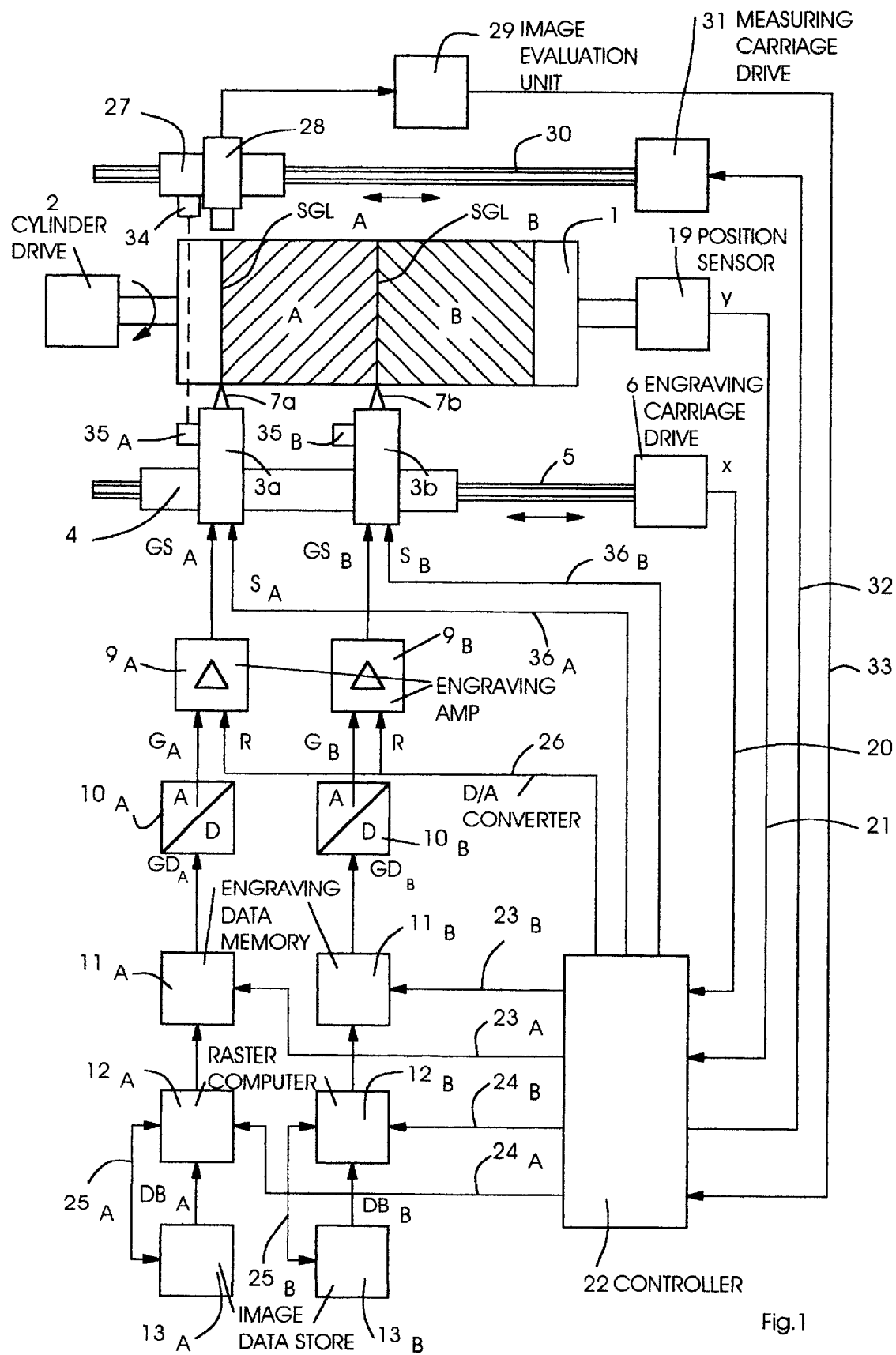
FIG. 1 is a schematic block circuit diagram of an engraving machine for printing cylinders.

FIG. 1 shows a schematic block circuit diagram of an engraving machine with a printing cylinder 1 that is rotationally driven by cylinder drive 2. For example, the engraving machine is a HelioKlischograph® of Hell Gravure Systems GmbH, Kiel, Del.

A plurality of engraving lanes lying side-by-side in the axial direction of the printing cylinder 1 are to be engraved on the printing cylinder 1, with a respectively allocated engraving element 3, two engraving lanes (A, B) with coinciding axial lane widths (SB) in the exemplary embodiment. Start engraving lines (SGL) respectively define the axial start of engraving of the engraving lanes (A, B) on the printing cylinder 1.

The engraving elements 3 that, for example, are designed as electromagnetic engraving elements with engraving stylii as cutting tools are located on an engraving carriage 4 on which they are individually displaceable and lockable in an axial direction of the printing cylinder 1 by manually actuatable or motor-actuatable spindle drives. For axial positioning of the engraving carriage 4 relative to the printing cylinder 1 and for feed of the engraving carriage 4 in the axial direction during engraving, this is moved in the axial direction of the printing cylinder (1) by an engraving carriage drive 6 via a spindle 5.

The engraving carriage drive 6 is designed, for example, as a precision drive with a stepping motor. The stepping motor is driven by a motor clock sequence whose clocks respectively correspond to a path increment of the engraving carriage 4 respectively traversed. By counting the clocks of the motor clock sequence, the respective axial position of the engraving carriage 4 can thus be identified or, respectively, the engraving carriage 4 can be displaced onto a defined, axial position by counting back a predetermined number of clocks. Such positioning drives are known and are commercially obtainable.

The engraving stylii 7 of the engraving elements 3 cut a sequence of cups into the generated surface of the rotating printing cylinder 1 engraving line by engraving line while the engraving carriage 4 with the engraving elements 3 is moved along the printing cylinder (1) in the feed direction. The cups are arranged in an engraving raster wherein the intersections of the raster network lines define the engraving locations of the for the cups.

The engraving of the cups in the illustrated exemplary embodiment occurs on individual engraving lines proceeding circularly in the circumference direction around the printing cylinder 1, whereby the engraving carriage 4 implements an axial feed step to the next engraving line after respectively engraving the cups on one engraving line.

Such an engraving method is disclosed, for example, by U.S. Pat. No. 4,013,829. Alternatively, the engraving of the engraving lanes (A, B) can also occur in an engraving line proceeding helically around the printing cylinder 1, whereby the engraving carriage 4 then implements a continuous feed motion during the engraving.

The engraving stylii 7 of the engraving elements 3 are controlled by engraving control signals (GS). The engraving control signals (GS) are formed in engraving amplifiers 9 from the superimposition of a periodic raster signal (R) with engraving signals (G) that represent the total values of the cups to be engraved between "black" and "white". Whereas the periodic raster signal (R) effects a vibrating lifting motion of the engraving stylii 7 for generating the engraving raster, the engraving signal values (G) define the respective penetration depth of the engraving stylii 7 into the generated surface of the printing cylinder 1 in conformity with the tonal values to be engraved. The engraving elements 3 also respectively comprise a scraper that removes the material being formed during engraving and a glide foot that is supported on the generated surface of the printing cylinder 1 and insures a constant spacing between the engraving stylus in its quiescent position and the generated surface of the printing cylinder 1. The scraper and glide foot can be lifted—preferably in the engraving pauses—off from the generated surface of the printing cylinder 1 with a controllable lift-off unit in order to avoid damage to the generated surface.

The frequency of the raster signal (R) together with the circumferential speed of the printing cylinder 1 and the axial feed step width of the engraving carriage 4 determine the geometry of the engraving raster with respect to screen angle and screen width.

The analog engraving signal values (G) are acquired from engraving data (GD) in A/D converters 10, these being intermediately stored in engraving data memories 11 and being read out therefrom engraving line by engraving line and being supplied to the A/D converters 10. An engraving datum of at least one byte that, among other things, contains the tonal value between "black" and "white" to be engraved as engraving information is allocated to each engraving location for a cup on the printing cylinder 1.

In the exemplary embodiment, the engraving data (GD) required for engraving the printed pages in the respective engraving raster are acquired on-line during the engraving by a raster conversion by means of interpolation in raster computers 12, being acquired from image data (BD) containing image and text information that are present in an original resolution independent of the respective engraving raster. The image data (BD) required for the interpolation of the engraving data (GD) are deposited in image data stores 13 in the form of addressable image data files.

The generation of the engraving data (GD) for the individual engraving locations of the engraving raster from the image data (BD) present in an original resolution with an interpolation calculation preferably occurs according to German Letters Patent 43 35 214.

Figure 2:
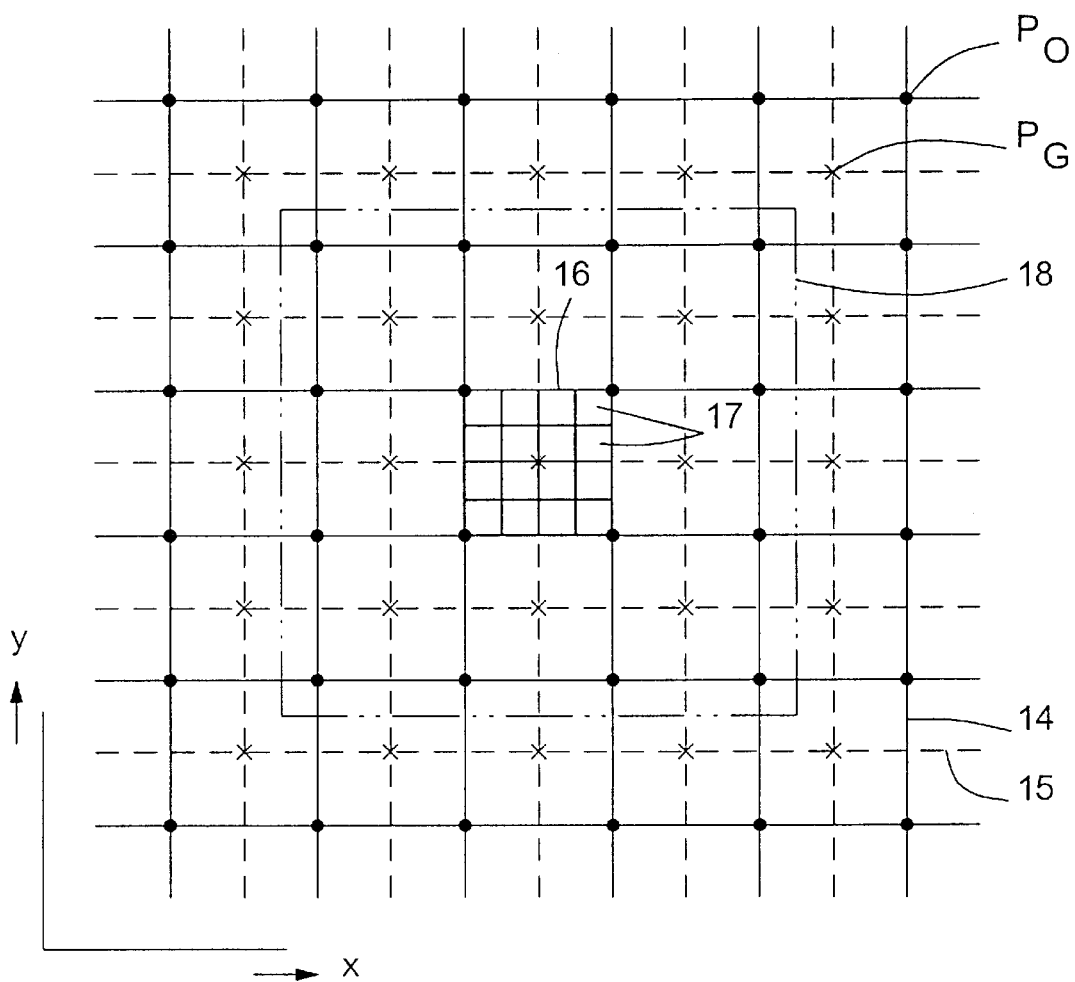
FIG. 2 is a graphic illustration for explaining the interpolation.

FIG. 2 shows an excerpt from an original raster 14 representing the original resolution with picture elements ($P_O$) in the points of intersection of the raster network lines of the original raster 14 and a corresponding excerpt from an engraving raster 15 with engraving locations ($P_G$) in the intersections of the raster network lines of the engraving raster 15. The rasters 14, 15 are oriented in circumferential direction (Y-direction) of the printing cylinder 1 and in the feed direction (X-direction) of the engraving carriage 4. The raster network lines of the engraving raster proceeding in the Y-direction form the engraving lines proceeding parallel to one another whose spacings from one another respectively correspond to a feed step of the engraving carriage 4.

A class field 16 is defined in the original raster (14). The class field (16) is subdivided into sub-fields 17 that represent the interpolation classes. The class field 16 has the size of a raster mesh of the original raster 14. An interpolation window 18 is defined around the class field 16, said interpolation window 18 respectively covering as many picture elements ($P_O$) of the original raster 14 as there are image data (BD) to participate in the interpolation of the engraving datum (GD) of an engraving location ($P_G$). A plurality of weighting coefficients is determined for each interpolation class of the class field 16, this corresponding to the plurality of picture elements ($P_O$) within the interpolation window 18. For that purpose, the respective distance of the sub-area 17, which represents the corresponding interpolation class, from the individual picture elements ($P_O$) within the interpolation window 18 is determined, and a weighting coefficient corresponding to the distance is calculated from a two-dimensional weighting function for each ($P_O$) within the interpolation window 18. The calculated sets of weighting coefficients for the individual interpolation classes are allocated to the corresponding sub-fields 17 and stored in callable fashion.

In the on-line interpolation of the engraving data (GD), the interpolation window 18 with the class field 16 is displaced across the original raster 14 until a respective engraving location ($P_G$) lies within the displaced class field 16. The displacement of the interpolation window 18 is controlled by the location coordinates (x, y) of a XY-coordinate system allocated to the printing cylinder 1 whose Y-axis is oriented in the circumferential direction (engraving direction) and whose X-axis is oriented in the axial direction (feed direction) of the printing cylinder 1. When an engraving location ($P_G$) lies within the displaced class field 16, that sub-field 17 into which the appertaining engraving location ($P_G$) falls is identified, and the set of weighting coefficients of that interpolation class that is allocated to the identified sub-field 17 is called. In conclusion, the engraving datum (GD) for the current engraving location ($P_G$) is calculated with the called set of weighting coefficients in that the image data (BD) of the picture elements ($P_O$) lying within the interpolation window 18 are respectively weighted with the called weighting coefficients, and the weighted image data (BD) are added in order to obtain the interpolated engraving datum (GD) of an engraving location ($P_G$).

The description of FIG. 1 continues below.

Each engraving data memory 11 is organized as an alternating memory with two memory areas. Whereas the engraving data (GD) of an engraving line to be currently engraved is read out from the one memory area, the engraving data interpolated in the raster computers 12 of the engraving line to be subsequently engraved are written into the other memory area.

The image data (BD) of the printed pages to be engraved that are required for the interpolation are acquired, for example, by point-by-point and line-by-line, optoelectronic scanning of individual masters in a scanner and are acquired by subsequent, electronic assembly of the individual masters to form the printed pages.

Each engraving location ($P_G$) in the engraving raster is defined by the location coordinates (x, y) of the XY-coordinate system. The engraving carriage drive 6 generates the x-location coordinates in the feed direction that define the axial positions of the engraving carriage 4 with reference to the printing cylinder 1. A position sensor 19 mechanically coupled to the printing cylinder 1 generates the corresponding y-location coordinates that define the relative circumferential positions of the rotating printing cylinder 1 relative to the engraving stylus 7. The location coordinates (x, y) of the engraving locations ($P_G$) are conducted to a controller 22 via lines 20, 21.

The controller 22 controls the engraving data memory 11, the raster computers 12 and the image data memories 13 in the interpolation of the engraving data (GD) from the image data (BD) as well as all of the executive sequences in the engraving.

With the assistance of the axial x-location coordinates of the start engraving lines (SGL) in the two engraving lanes (A, B), the respective x-location coordinates of the engraving locations ($P_G$) on the engraving lines to be currently engraved are calculated from the location coordinates (x, y) in the controller 22 for addressing the corresponding engraving data (GD). The controller 22 also generates a write clock sequence and a read clock sequence with the engraving data (GD) which are written into the engraving data memory 11 and read out therefrom. Addresses, read clock sequence, write clock sequence and corresponding control commands are supplied to the engraving data memories 11 via lines 23.

The location coordinates (x, y) of the engraving locations ($P_G$) on the engraving lines in the two engraving lanes (A, B) to be currently engraved and corresponding control signals are also forwarded via lines 24 to the raster computers 12. The engraving locations on the engraving lines to be sequently engraved are determined in the raster computers 12 from the location coordinates (x, y), and the engraving data (GD) for the engraving locations on the engraving lines to be subsequently engraved are then interpolated from the corresponding image data (BD).

The image data (BD) required for the interpolation are addressed in the image data memories 13 proceeding from the raster computers 12, are read out from the image line memories 13 with read clock sequences and are supplied to the raster computers 12. Raster computers 12 and image data memories 13 are in interactive connection via lines 25.

The controller 22 also generates the raster signal (R) that is supplied to the engraving amplifiers 9 via a line 26.

Before the beginning of engraving, the spacings of the engraving stylus tips of the engraving elements 3 on the engraving carriage 4 must be set to the lane width (SB) of the engraving lanes, and the engraving stylus tips of the engraving elements 3 must be subsequently potentially positioned to the axial start engraving lines (SGL) of the engraving lanes by displacement of the engraving carriage 4.

For setting the axial distance between the engraving stylus tips of the engraving elements 3, the engraving machine inventively comprises a position measuring unit 27, 28, 29 that, in the exemplary embodiment, is essentially composed of a measuring carriage 27 displaceable in the axial direction of the printing cylinder 1 with a video camera 28 and of an image evaluation unit 29 for evaluating the video image generated by the video camera 28. The measuring carriage 27 is moved with a spindle 30 by a measuring carriage drive (31) that is likewise designed as a precision drive with a stepping motor.

For preparation of the distance setting of the engraving stylus tips of the engraving elements 3 on the engraving carriage 4, axial reference positions (RP) are defined, their spacing from one another respectively corresponding to the required lane width (SB). The axial position of the reference position (RP) with reference to the printing cylinder 1 is fundamentally arbitrary. However, it proves expedient when the reference positions (RP) spaced from one another by the lane width (SB) coincide with the axial positions of the two start engraving lines (SGL) on the printing cylinder 1 likewise spaced from one another by the lane width (SB), since, in this case, a positioning of the engraving carriage 4 to the corresponding start engraving lines (SGL) is superfluous after the spacing setting of the engraving stylus tips.

By prescribing the x-location coordinates ($x_{REF}$) of the reference positions (RP), a measuring mark of the video camera 28 is positioned exactly onto one of the reference positions (RP) with the measuring carriage drive 31. The predetermined x-location coordinates ($x_{REF}$) and corresponding control commands are communicated from the controller (22) to the measuring carriage drive (31) via a line (32).

By evaluating the video images of the engraving stylus tips of the engraving elements (3) registered with the video camera (28)—or some other respective reference point in a plane oriented perpendicularly relative to the axial direction and proceeding through the stylus tip—, the axial actual positions of the engraving stylus tips of the engraving elements 3 are identified with the position measuring unit 27, 28, 29, these having been previously set only roughly to the reference positions (RP) by an operator either manually or under motor-drive.

Subsequently, the spacing errors $\pm\Delta x$ are measured in the image evaluation unit 29 by forming the difference between the x-location coordinates of the actual positions of the engraving stylus tips and the x-location coordinates of the corresponding reference positions (RP). The spacing errors $\pm\Delta x$ can amount to a multiple of the engraving line spacing +/− a residual error. The measured spacing errors $\pm\Delta x$ proceed via a line 33 to the controller 22 for further-processing.

For rough axial displacement of the engraving elements 3 into the region of the reference positions (RP) implemented manually or under motor drive, the engraving machine comprises an auxiliary unit, for example in the form of a light barrier 34, 35 aligned perpendicular to the axial direction. For that purpose, a light beam generator 34 is attached to the measuring carriage 27 and a respective light sensor 35 is attached to the engraving elements 3, this generating an optical or acoustic signal given manual displacement of the engraving elements 3 by the operator and generating an electrical control signal given motor-displacement of the engraving elements 3 when the engraving stylus tip of an engraving element 3 is located within the permitted range of measurement of the position measuring unit 27, 28, 29.

The determination of the actual positions of the engraving stylus tips expediently occurs before the printing cylinder 1 is introduced into the engraving machine. The video camera 28 is thereby respectively displaced perpendicular to the axial direction on a support of the measuring carriage 27 such that this supplies a sharp video image of the engraving stylus tip.

As already mentioned, the actual positions of other reference points can be determined instead of the actual positions of the engraving stylus tips of the engraving elements 3, for example the axial actual positions of cups engraved on the printing cylinder 1 as trials with the individual engraving elements 3. In this case, the video camera 28 registers video images of the cups engraved as trials, these being correspondingly interpreted in the image evaluation unit 29 for determining the actual positions and the axial spacing errors $\pm\Delta x$ of the cups from the reference positions (RP).

The lift-off devices (not shown in greater detail) for the glide foot and scraper in the engraving elements 3 are actuated by engraving enable signals (S) on lines 36.

The inventive method for engraving engraving lanes on a printing cylinder is explained in greater detail below on the basis of method steps [I] through [IV] and the illustrations in FIG. 3 and in FIG. 4.

The method steps described by way of example for engraving four engraving lanes with four allocated engraving elements 3 also apply, of course, for engraving an arbitrary plurality of engraving lanes with identical or different lane widths (SB).

In a first method step [I], the engraving elements 3 participating in the engraving of the engraving lanes are roughly shifted onto the reference positions (RP), the spacings of these from one another corresponding to the predetermined lane widths (SB) of the engraving lanes, and are fixed thereat. Subsequently, the axial spacing errors $\pm\Delta x$ of the engraving stylus tips caused by the rough positioning of the engraving elements 3 or the cups engraved as trials relative to the reference positions (RP) are measured by forming the difference between the x-location coordinates of the actual positions of the engraving stylus tips or the cups and the x-location coordinates of the corresponding reference positions (RP). A distinction is made between positive spacing errors and negative spacing errors in the measuring of the spacing errors $\pm\Delta x$, whereby positive spacing errors $\pm\Delta x$ derive when the actual positions lie to the right of the corresponding reference positions as viewed in feed direction and negative spacing errors $-\Delta x$ derive when the actual positions lie to the left of the corresponding reference positions.

Figure 3A:
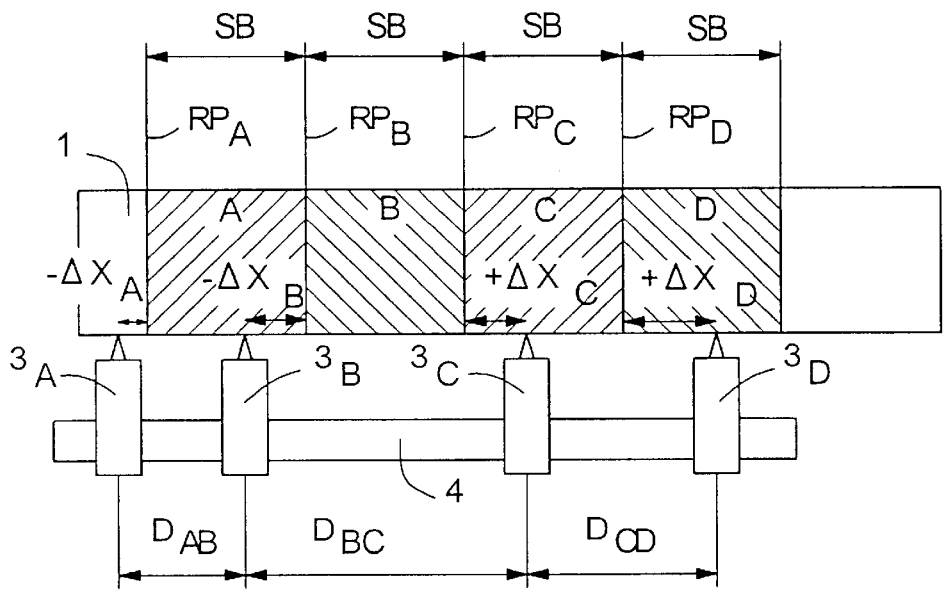
FIG. 3 is an illustration for explaining the spacing errors that have arisen due to a rough positioning of the engraving elements and their electronic compensation when engraving the engraving lanes.

In a schematic illustration, FIG. 3a shows the engraving of, for example, four engraving lanes, (A, B, C, D). In this case, the measuring carriage 27 for measuring the positive or negative, axial spacing errors $\pm\Delta x$ of the engraving stylus tips of the engraving elements 3 relative to the reference position (RP) is first moved on to the first reference position ($RP_A$). The first engraving element $3_A$ allocated to the first engraving lane (A) is then roughly displaced until the light barrier 34, 35 of the measuring carriage 27 signals that the engraving stylus tip of the first engraving element $3_A$ is located in the range of measurement of the video camera 28. The axial spacing error $\pm\Delta x_A$ between the engraving stylus tip of the first engraving element $3_A$ and the first reference position $RP_A$ is then determined in the image evaluation unit 29. For the sake of clarity, the spacing errors are shown disproportionally large compared to the lane widths.

Subsequently, the measuring carriage 27 is displaced by the lane width (SB) onto the second reference position ($RP_B$), and the second engraving element $3_B$ allocated to the second engraving lane (B) is roughly set onto the second reference position ($RP_B$) until the light barrier 34, 35 of the measuring carriage 27 again signals that the engraving stylus tip of the second engraving element $3_B$ is located in the range of measurement of the video camera 28. The spacing error $\pm\Delta x_B$ between the engraving stylus tip of the second engraving element $3_B$ and the second reference position ($RP_B$) is then measured in the image evaluation unit 29. One proceeds in the same way with the other two engraving elements $3_C$, $3_D$ in order to determine the spacing errors $\pm\Delta_C$ and $\pm\Delta_D$. For measuring the positive or negative axial spacing error $\pm\Delta x$ between the cups engraved as trials with the engraving elements $3_A$, $3_B$, $3_C$, $3_D$ and the reference position ($RP_A$, $RP_B$, $RP_C$, $RP_D$), all engraving elements $3_A$, $3_B$, $3_C$, $3_D$ are first expediently roughly positioned to the reference positions ($RP_A$, $RP_B$, $RP_C$, $RP_D$), and at least one cup on the printing cylinder 1 is then engraved with the engraving element $3_A$, $3_B$, $3_C$, $3_D$. After the trial engraving of the cups, the measuring carriage 27 with the video camera 28 is then successively positioned onto the reference positions ($RP_A$, $RP_B$, $RP_C$, $RP_D$), and the spacing errors $\pm\Delta x_A$, $\pm\Delta x^B$, $\pm\Delta x_C$ and $\pm\Delta x_D$ of the engraved cups from the reference position ($RP_A$, $RP_B$, $RP_C$, $RP_D$) is then measured.

FIG. 3a shows the roughly positioned engraving stylus tips of the four engraving elements $3_A$, $3_B$, $3_C$, $3_D$ at the four reference positions ($RP_A$, $RP_B$, $RP_C$, $RP_D$) that are respectively spaced from one another by the predetermined lane width (SB).

In the example shown in FIG. 3a, negative spacing errors $-\Delta x_A$ and $-\Delta x_B$ relative to the first or, respectively, second reference position ($RP_A$, $RP_B$) derive for the engraving stylus tips of the first and second engraving element $3_A$, $3_B$, since the actual positions of the engraving stylus tips—as viewed in feed direction—lie to the left of the first or, respectively, second reference position ($RP_A$, $RP_B$). By contrast thereto, positive spacing errors $\pm \Delta x_C$ and $\pm \Delta x_D$ relative to the third or, respectively, fourth reference position ($RP_C$, $RP_D$) derive for the engraving stylus tips of the third and fourth engraving element $3_C$, $3_D$, since the actual positions of the engraving stylus tips lie to the right of the third or, respectively, fourth reference position ($RP_C$, $RP_D$).

The faulty actual spacing between the engraving stylus tips of the first and second engraving element $3_A$, $3_B$ is thus ($D_{AB} = SB + \Delta x_A - \Delta x_B$), the faulty actual spacing between the engraving stylus tips of the second and third engraving element $3_B$, $3_D$ is $D_{BC} = SB + \Delta x_B + \Delta x_C$; and the faulty actual spacing between the engraving stylus tips of the third and fourth engraving element $3_C$, $3_D$ is ($D_{CD} = SB - \Delta x_C + \Delta x_D$).

In a method step [II], a determination is first made as to whether positive spacing errors $\pm \Delta x$ were measured in method step [I]. When this is not the case, one continues with method step [IV]. When, by contrast, positive spacing errors $\pm \Delta x$ were measured, the maximum positive spacing error $\pm \Delta x_{MAX}$ is first determined. In FIG. 3a, for example, the engraving stylus tip of the fourth engraving element $3_D$ has the maximum positive spacing error $\pm \Delta x_D = \Delta X_{MAX}$.

In a method step [III], the measured spacing errors $\pm \Delta x$ are computationally (FIG. 3) or mechanically (FIG. 4) corrected in order to assure that no engraving information is lost when engraving the engraving lanes.

Given the computational correction of the spacing errors according to FIG. 3, the maximum positive spacing error $+\Delta x_{MAX}$ is corrected to at least zero, i.e. directly to zero, or to a negative spacing error $-\Delta x$ by forming the difference between the spacing errors $\pm \Delta x$ and a correction value, and the other spacing errors $\pm \Delta x$ are corrected according to the correction value. Given the correction of the maximum positive spacing error $+\Delta x_{MAX}$ to zero, the correction value for all spacing errors is thus equal to the maximum positive spacing error $+\Delta x_{MAX}$.

In the example shown in FIG. 3a, a computational correction of the spacing errors occurs. In this case, thus the maximum positive spacing error $\pm \Delta x_D$ of the engraving stylus tip of the fourth engraving element $3_D$ is set to zero according to the equation $\Delta x_D^* = \Delta x_D - \Delta x_{MAX} = 0$, and the spacing errors $\pm \Delta x_A$, $\pm \Delta x_B$ and $\pm \Delta x_C$ of the engraving stylus tips of the first, second and third engraving element $3_A$, $3_B$, $3_C$ are corrected according to the equations [sic] $\Delta x_A^* = \Delta X_A - \Delta x_{MAX}$, the equation $\Delta x_B^*$, $\Delta x_B - \Delta x_{Max}$ and the equation $\Delta x_C^* = \Delta x_C - \Delta x_{Max}$.

In a method step [IV], the engraving of the engraving lanes (A, B) occurs with the engraving elements 3 in the correct position relative to one another. During the engraving of the engraving lanes (A, B), the spacing errors $-\Delta x^*$ caused by the rough positioning of the engraving elements 3 and corrected in method step [III] are compensated by an "electronic shift" of the engraving lanes on the printing cylinder 1 such that the engraving lanes exhibit the predetermined lane widths (SB) despite the spacing errors of the engraving stylus tips.

The electronic shift of the engraving lanes during engraving is achieved in that start vectors (SV) are first defined in the direction of the X-axis of the XY coordinate system, these corresponding to the spacing errors $-\Delta x^*$ corrected in method step [III], and in that the time editing and offering of the engraving control signal values (GS) relevant for the shifted engraving lines are controlled by the start vectors (SV) dependent on the axial positions of the individual engraving elements 3 or, respectively, of the engraving carriage 4 relative to the printing cylinder 1 achieved by the feed motion.

Given the start of engraving, that engraving element 3 whose spacing error was compensated to zero begins with the engraving of the start engraving line (SGL) of the corresponding engraving lane immediately at the axial actual position assumed by the rough positioning of the engraving element 3. The other engraving elements 3, which are still affected with spacing errors $-\Delta x^*$, begin engraving the start engraving lines (SGL) of the corresponding engraving lanes delayed, after the engraving elements 3 have traversed a feed path corresponding to the corresponding start vector (SV)—respectively proceeding from the axial position assumed as a result of the rough setting of the engraving element 3.

In the example shown in FIG. 3a, the engraving element $3_D$ thus begins with the immediate engraving of the start engraving line ($SGL_D$) of the engraving lane (D), whereas the other engraving elements $3_A$, $3_B$, $3_C$ do not begin engraving the start engraving lines ($SGL_A$, $SGL_B$, $SGL_C$) of the engraving lanes (A, B, C) until after a distance corresponding to the respective start vector ($SV_A$, $SV_B$, $SV_C$) has been traversed.

The editing and offering of the engraving control signal values (GS) is controlled with the assistance of the start vectors (SV) such that the engraving control signal values (GS) relevant to the engraving of the shifted start engraving lines (SGL) are forwarded to the engraving elements (3) at the points in time at which the engraving stylus tips of the engraving elements 3 have respectively reached the axial position of the shifted start engraving line (SGL) given the feed motion of the engraving carriage 4.

The engraving data (GD) for the engraving locations ($P_G$) on the individual engraving lines are generated in the exemplary embodiment by an interpolation calculation in the raster computers 12 that is shifted by the corresponding axial start vectors (VS). For the implementation of the interpolation calculation shifted by the start vectors (VS), the x start points for the interpolation calculation in the described exemplary embodiment are shifted on the X-axis of the XY coordinate system opposite the feed direction, being shifted by the respective start vector (SV) proceeding from the x-start addresses of the corresponding image data data files. The start point shift corresponds to a shift of the interpolation window 18 controlled by the location coordinates (x, y) in the raster computers 12 by the respective start vectors (SV).

Since the measured spacing errors $\pm \Delta x$ and, thus, the start vectors (SV) as well can amount to a multiple of the engraving line spacing $+/-$ in the axial residual error, the engraving lines do not "fit" with the engraving raster that is the critical factor for engraving with exactly positioned engraving elements 3. Due to the interpolation shifted by the start vectors (SV), the engraving data (GD) are respectively interpolated exactly for the engraving lines offset by the residual error, as a result whereof a high interpolation precision and, thus, a high precision in the engraving of the engraving lanes is achieved, despite the mispositioned engraving elements 3.

Care must be exercised within the distances that the engraving elements 3 traverse from the actual positions to the start engraving lines (SGL) to see that no information is engraved on the printing cylinder 1, i.e. a "super white", whereby the engraving stylus tips do not touch the generated surface of the printing cylinder 1. When the image data data files comprise "white edges" with the engraving information "super white" and the start vectors (SV) lie within the "white edges" of the image data data files, the engraving data "super white" are interpolated and are forwarded to the engraving elements 3 as engraving control signal values (GS).

When this is not the case, the engraving data (GD) interpolated within the distances or, respectively, the engraving control signal values (GS) that are not relevant for the engraving of the engraving lanes must be suppressed. This can occur, for example, by a corresponding control of the engraving amplifiers 9 or, as in the exemplary embodiment, by lift-off of glide feet and scrapers with the lift-off mechanisms in the engraving elements 3 controlled by the engraving enable signals (S) on the lines 36. The lift-off of glide feet and scrapers is additionally recommended when engraving "super white" in order to protect the generated surface of the printing cylinder 1 against damage.

Figure 3B:
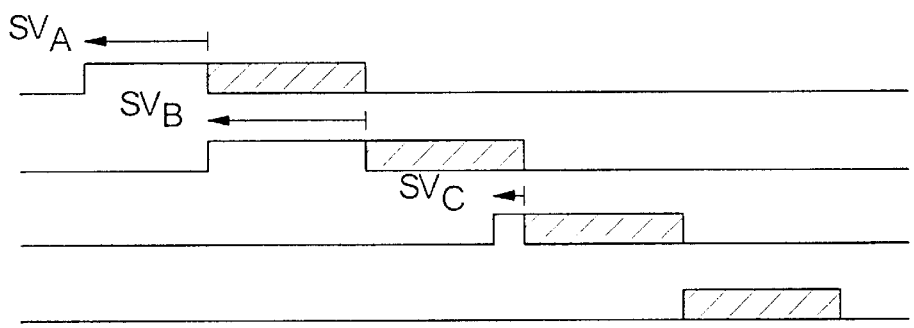

For explaining the engraving control in conjunction with FIG. 3a, FIG. 3b schematically shows the executive sequences of the interpolation when engraving the four engraving lanes (A, B, C, D) dependent on the x-coordinates. The shift of the interpolation by the respective start vectors $SV_A$, $SV_B$, and $SV_C$ is shown, whereby the start vector $SV_D=0$ is the electronic compensation of the maximum spacing error to zero undertaken in method step [III]. The pulse areas that are not hatched are intended to indicate that interpolation is already done but the interpolated engraving data (GD) are not employed. The hatched pulse areas, by contrast, indicate that the interpolated engraving data (GD) are converted into the engraving control signal values ($GS_A$, $GS_B$, $GS_C$, $GS_D$) and are supplied to the engraving elements 3A, 3B, 3C, 3D.

Figure 3C:
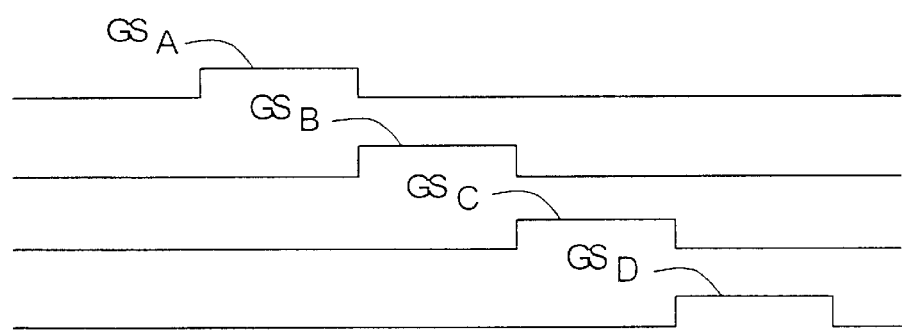

For explaining the engraving control in conjunction with FIG. 3a and FIG. 3b, FIG. 3c shows the offering of the engraving control signal values ($GS_A$, $GS_B$, $GS_C$, $GS_D$) for the engraving elements (3A, 3B, 3C, 3D) dependent on the x-coordinates when engraving the four engraving lanes (A, B, C, D).

Figure 3D:
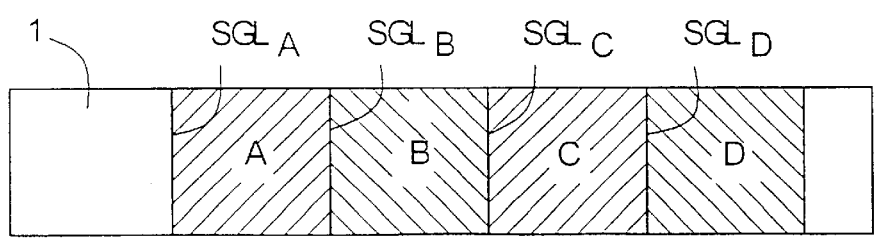

FIG. 3d shows the result of the electronic shift of the engraving lanes (A, B, C, D) in the engraving for the purpose of compensating the spacing errors of the mispositioned engraving elements 3. It can be seen from the illustration that all engraving lanes (A, B, C, D) exhibit exactly the required lane widths (SB) despite engraving element spacings that were only incorrectly set before the engraving.

FIG. 4 explains that case wherein, in method step [III], the maximum spacing error $\pm\Delta x_{MAX}$ is mechanically corrected. In the mechanical correction, the maximum spacing error $\pm\Delta x_{MAX}$ is set to zero in that the engraving carriage 4 with the roughly positioned engraving elements 3 is shifted opposite the feed direction by at least the maximum spacing error $\pm\Delta x_{MAX}$. As a result thereof, the engraving stylus tip of that engraving element 3 that exhibits the maximum positive spacing error $\pm\Delta x_{MAX}$ is positioned on the corresponding reference position (RP). The engraving stylus tips of the other engraving elements 3 then comprise the correspondingly corrected, mechanical spacing errors $\pm\Delta^*$.

Figure 4A:
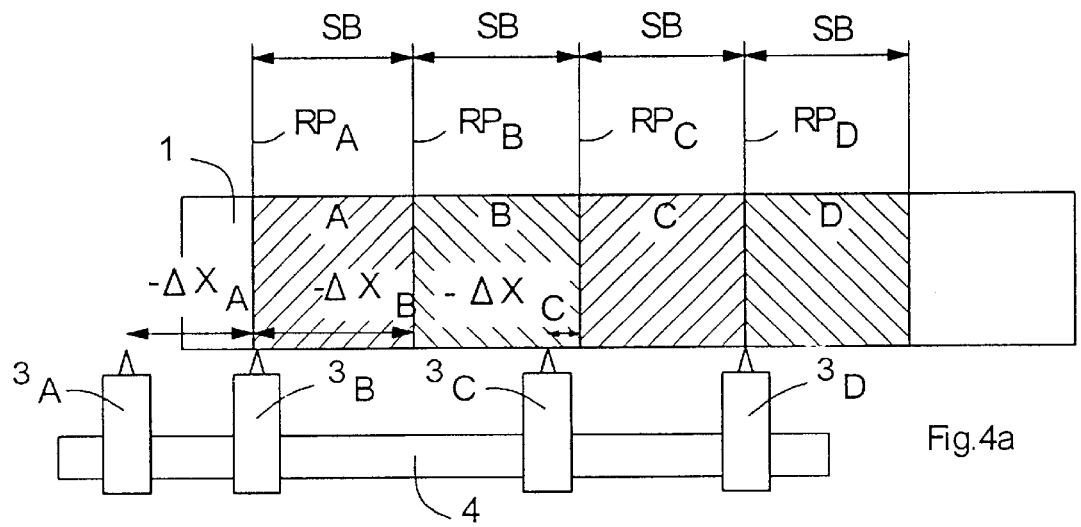
FIG. 4 is a further illustration for explaining the spacing errors that have arisen due to the rough positioning of the engraving elements and their electronic compensation when engraving the engraving lanes.

FIG. 4a, which is based on the same spacing errors as in FIG. 3a, shows the conditions after displacement of the engraving carriage 4. Due to the displacement, the maximum positive spacing error $\pm\Delta x_D$ of the engraving stylus tip of the fourth engraving element $3_D$ has been brought to zero, whereas the spacing errors $\pm\Delta x_A$, $\pm\Delta x B_B$ and $\pm\Delta x_C$ of the engraving stylus tips of the first, second and third engraving elements $3_A$, $3_B$ $3_C$ were corrected to the values $-\Delta x_A^*$, $-\Delta x_B^*$ and $-\Delta x_C^*$ due to the displacement.

Figure 4B:
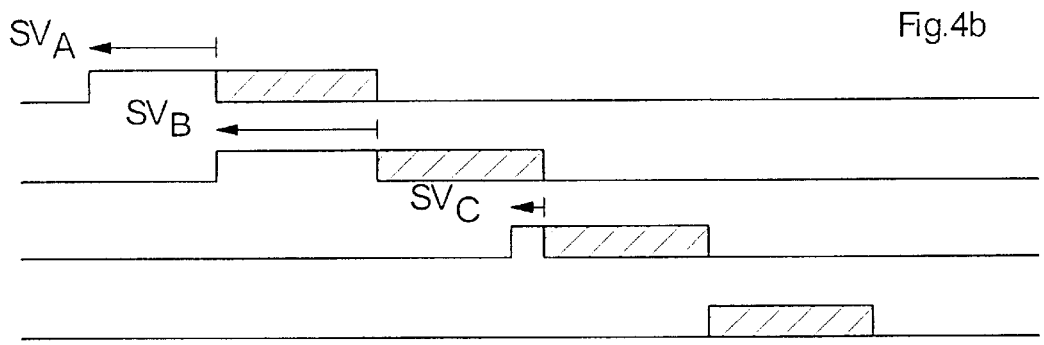

Again for explaining the engraving control in conjunction with FIG. 4a, FIG. 4b schematically shows the executive sequences of the interpolation when engraving the four engraving lanes (A, B, C, D) dependent on the x-coordinates.

Figure 4C:
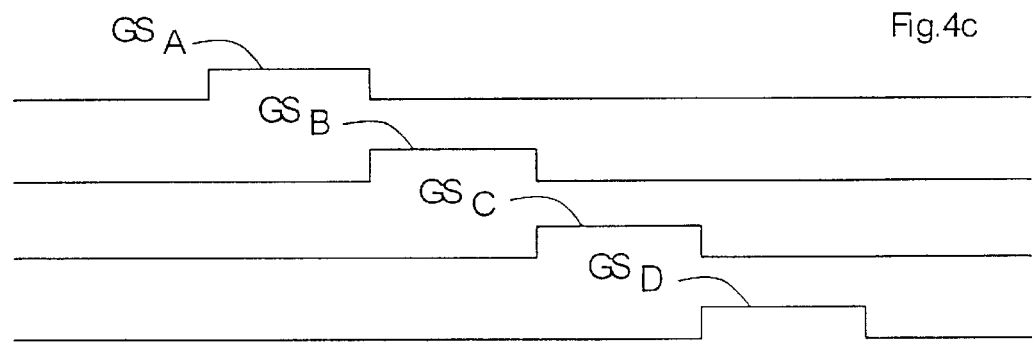

Again for explaining the engraving control in conjunction with FIG. 4a and FIG. 4b, FIG. 4c shows the offering of the engraving control signal values ($GS_A$, $GS_B$ $GS_C$, $GS_D$) for the engraving elements 3A, 3B, 3C, 3D dependent on the x-coordinates when engraving the four engraving lanes (A, B, C, D).

Figure 4D:
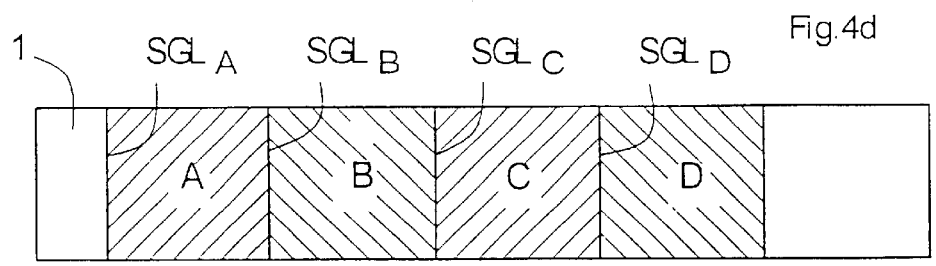

FIG. 4d shows the result of the electronic shift of the engraving lanes (A, B, C, D) during the engraving for the purpose of compensating the spacing errors of the mispositioned engraving elements 3. It can be seen from the illustration that all engraving lanes (A, B, C, D) again exactly comprise the required lane widths (SB) despite engraving element spacings there were only incorrectly set before the engraving.

The invention is not limited to the illustrated exemplary embodiments.

For example, electron beam or laser engraving elements can be employed alternatively to electromagnetic engraving elements with engraving stylii as cutting tools.

Other embodiments are also conceivable for the position measuring unit 27, 28, 29.

Instead of the evaluation of the video image compared to an "electronic" measuring mark for determining the spacing errors $\pm\Delta x_A$, the measuring carriage 27 can also be successively displaced onto the actual positions and the reference positions, and the spacing errors $\pm\Delta x$ can be identified directly from the location coordinate differences of the measuring carriage 31 in the two positions.

For example, a commercially obtainable length measuring system MR-MAGNESCALE® of sony Magnescale Inc., Tokyo, JP can also be employed for positioning the measuring carriage (27) onto the reference positions and for measuring the axial spacing errors $\pm\Delta x$ between the actual positions and the reference positions. In this case, a magnetically readable measuring scale is arranged in axial direction, this being read and interpreted by a read head located at the measuring carriage 27. The determination of the spacing errors $\pm\Delta x_A$ can, for example, also occur according to an interferrometric measuring method with an interferometer mounted on the measuring carriage 27.

Alternatively to the exemplary embodiment shown in FIG. 1, whereby the engraving data (GD) are acquired by interpolation, the engraving data (GD) can already be present in the required engraving raster. The raster computers 12 and the image data stores 13 are then eliminated. In this case, the engraving data (GD) required for the electronic compensation of the spacing errors ($\Delta x^*$) in the engraving of the engraving lanes are acquired by an addressing of the engraving data stores 11 modified by the start vectors (VS).

The inventive method can be employed both when engraving circular engraving lines having step-by-step feed as well as when engraving a helical engraving line with continuous feed. When engraving a helical engraving line, spacing errors in the X-direction and in the Y-direction derive due to the mispositioning of the engraving elements, and the start vectors (VS) are determined from the respective axial spacing errors as X-vector component ($VS_x$) and of a Y-vector component ($SV_y$) that derives from the slope of the helix.

The inventive method is particularly suited for engraving a great plurality of engraving lanes on a printing cylinder. Since a fine positioning of all engraving elements participating in the engraving on the engraving carriage is eliminated, the precatory phase is advantageous significantly shortened and a high engraving precision in the engraving is nonetheless achieved. Morever, the engraving precision is essentially independent of the dexterity of an operator.

Although various minor changes and modifications might be proposed by those skilled in the art, it will be understood that my wish is to include within the claims of the patent warranted hereon all such changes and modifications as reasonably come within my contribution to the art.

What is claimed is:

1. A method for engraving printing cylinders for rotogravure in an electronic engraving machine wherein at least two engraving lanes with predetermined lane widths lying next to one another in an axial direction of the printing cylinder are engraved with an allocated respective engraving element, comprising the steps of:

before engraving, setting axial spacings of the engraving elements relative to one another and predetermining an axial reference position for each engraving element, axial spacings of the reference positions relative to one another corresponding to said predetermined lane widths of the engraving lanes;

roughly positioning the engraving elements to their reference positions;

measuring axial spacing errors between the reference positions and actual positions of the engraving elements based on the rough positioning;

engraving with the engraving elements a sequence of cups arranged in an engraving raster into the rotating printing cylinder, and forming engraving control signals for drive of the engraving elements by superimposition of engraving signals that represent tonal values to be engraved with a periodic raster signal for generating said raster;

during said engraving, executing with the engraving elements a feed motion along the printing cylinder in the axial direction and with faulty spacings relative to one another caused by the rough positioning; and compensating the axial spacing errors by a shifted engraving of the engraving lanes on the printing cylinder such that the engraving lanes exhibit said predetermined lane widths despite the faulty spacings of the engraving elements relative to one another.

2. The method according to claim 1 wherein the engraving elements are displaceably and lockably arranged on an engraving carriage;

the engraving elements are roughly positioned to their reference positions and are locked on the engraving carriage in the actual positions assumed as a result of the rough positioning; and the engraving carriage with the locked engraving elements executes the feed motion along the printing cylinder during the engraving.

3. The method according to claim 1 wherein the cups are engraved on engraving lines proceeding circularly around the printing cylinder; and the engraving elements execute a feed step corresponding to an engraving line spacing after the engraving of an engraving line.

4. The method according to claim 1 wherein a distinction is made in the measurement of the spacing errors as to whether the actual positions of the engraving elements lie toward the right as viewed in a feed direction representing a positive spacing error or to the left as a negative spacing error of the corresponding reference positions;

when positive spacing errors are measured, a maximum positive spacing error is identified;

the maximum positive spacing error is corrected at least to zero by subtraction of a correction value and the other spacing errors are corrected by the correction value, whereby the correction value in the correction of the maximum positive spacing error to zero is equal to the maximum positive spacing error; and the corrected spacing errors are compensated by shifted engraving of the engraving lanes on the printing cylinder.

5. The method according to claim 1 wherein a distinction is made in the measurement of the spacing errors as to whether the actual positions of the engraving elements lie to a right in the feed direction as positive spacing errors or to the left as negative spacing errors of the corresponding reference positions;

when positive spacing errors are measured, a maximum positive spacing error is determined;

by shifting the engraving carriage by a correction value opposite the feed direction, the maximum positive spacing error is corrected at least to zero and the other spacing errors are mechanically corrected by the correction value, whereby the correction value given correction of the maximum positive spacing error to zero is equal to the maximum positive spacing error; and the corrected spacing errors are compensated by the shifted engraving of the engraving lanes on the printing cylinder.

6. The method according to claim 1 wherein the actual position of an engraving element is defined by a plane proceeding perpendicularly relative to the axis of the printing cylinder and proceeding through a member of the engraving element that generates the cups.

7. The method according to claim 6 wherein the actual position of an engraving element is defined by a tip of an engraving stylus of a mechanical engraving element.

8. The method according to claim 6 wherein the actual position of the engraving element is defined by a position of at least one cup engraved as a trial on the printing cylinder with the corresponding engraving element.

9. The method according to claim 1 wherein the spacing errors of the roughly positioned engraving elements relative to their reference positions are determined with a video camera and an image evaluation unit of a position measuring unit.

10. The method according to claim 9 wherein the video camera is arranged in the engraving machine positionable in the axial direction of the printing cylinder on a measuring carriage.

11. The method according to claim 10 wherein the video camera is automatically positioned to the reference positions with a drive for the measuring carriage.

12. The method according to claim 10 wherein for measuring the spacing error of a roughly positioned engraving element the video camera is positioned to the corresponding reference position of the engraving element with the measuring carriage;

the video camera registers a video image of an engraving stylus tip of the corresponding engraving element or a video image of at least one cup engraved as a trial on the printing cylinder with the corresponding engraving element as an actual position of the corresponding engraving element; and the spacing error between the actual position of the engraving element and the corresponding reference position is determined by electronic evaluation of the video image in the image evaluation unit.

13. The method according to claim 10 wherein for measuring the spacing error of a roughly positioned engraving element the video camera registers a video image of an engraving stylus tip of the corresponding engraving element or a video image of at least one cup engraved as a trial on the printing cylinder with the corresponding engraving element as an actual position of the corresponding engraving element;

the measuring carriage is brought into a measuring position wherein the actual position of the engraving element coincides with a reference mark of the measuring carriage;

the measuring carriage is positioned to the corresponding reference position; and the spacing error is determined from a path difference of the measuring carriage between measuring position and reference position.

14. The method according to claim 9 wherein for determining the spacing errors of all roughly positioned engraving elements, the video camera is successively positioned to the individual reference positions of the engraving elements;

the corresponding engraving element is roughly set to the reference position at each reference position; and the spacing error is identified at every reference position by evaluating the video image of the engraving stylus tip registered with the video camera.

15. The method according to claim 9 wherein for determining the spacing errors of all roughly positioned engraving elements the engraving elements are roughly positioned to the corresponding reference positions;

at least one cup is engraved as a trial on the printing cylinder with each engraving element;

the video camera is successively positioned to the individual reference positions;

the corresponding engraving element is roughly set at each reference position to the reference position; and the spacing error at every reference position is determined by evaluating the video image of the cup engraved as a trial registered with the video camera.

16. The method according to claim 9 wherein an auxiliary unit is provided that generates a signal as soon as an engraving element is located within the measuring range of the position measuring unit during the rough positioning.

17. The method according to claim 16 wherein the auxiliary unit is designed as a light barrier.

18. The method according to claim 1 wherein for compensation of the corrected spacing errors in the engraving of the engraving lanes on the printing cylinder that engraving element whose maximum positive spacing error was at least corrected to zero begins with the engraving of the corresponding engraving lane upon engraving start directly at its actual position;

the other engraving elements begin with the engraving of the corresponding engraving lanes respectively shifted by the corrected spacing error, after they have traversed feed paths from their actual positions corresponding axially to the corrected spacing errors;

axial start vectors are generated, a length thereof corresponding to the corrected spacing errors; and the provision of the engraving data required for engraving the cups on the topically shifted engraving lines is controlled by the axial start vectors.

19. The method according to claim 18 wherein for each engraving lane the engraving data for the engraving locations defined by the print raster are generated from image data on the basis of an interpolation calculation; and the axial start point for the interpolation calculation is shifted from the start engraving line of the appertaining engraving lane onto the actual position of the engraving element opposite the feed direction at the start of engraving, being shifted by the axial start vector.

20. The method according to claim 18 wherein for each engraving lane the image data are present in an original raster;

a class field having the size of a raster mesh of the original raster is defined and the class field is subdivided into sub-fields representing interpolation classes;

weighting coefficients are stored for the individual interpolation classes in callable fashion;

an interpolation window is defined around the class field, this respectively comprising as many image data as participate in the calculation of an engraving datum of the engraving raster;

the class field together with the interpolation window is synchronously displaced across the original raster during the engraving in synchronization with the feed motion of the engraving element and the rotary motion of the printing cylinder until an engraving location of the engraving raster lies within the shifted class field;

the sub-field in which the engraving location falls is identified;

weighting coefficients of the interpolation class previously allocated to the identified sub-field are called; and the engraving datum of the engraving location is calculated from the image data lying in the interpolation window being calculated with the assistance of the called weighting coefficients.

21. The method according to claim 20 wherein the interpolation window is shifted by the corresponding axial start vector relative to the start engraving line of an engraving lane, being shifted onto the actual position of the engraving element opposite the feed direction at the beginning of engraving.

22. The method according to claim 1 wherein the predetermined reference positions at least approximately coincide with desired start positions of the engraving lanes on the printing cylinder.

23. The method according to claim 1 wherein the engraving carriage is displaced before the engraving such that the actual position of at least one of the engraving elements coincides with a desired start position of an engraving lane on the printing cylinder.

24. The method according to claim 1 wherein the engraving elements engrave a "super white" during their axial displacement paths from the actual positions to start engraving lines.

25. The method according to claim 1 wherein lift-off devices for scrapers and a glide foot of the engraving elements are lifted off from the printing cylinder during their axial feed paths from the actual positions to start engraving lines.

26. A method for engraving printing cylinders for rotogravure wherein at least two engraving lanes with predetermined lane widths lying next to one another in an axial direction of the printing cylinder are engraved with an allocated respective engraving element, comprising the steps of:

before engraving, setting an axial spacing of the at least two engraving elements relative to one another and predetermining an axial reference position for each engraving element, an axial spacing of the at least two reference positions relative to one another corresponding to said predetermined lane widths of the engraving lanes;

roughly positioning the engraving elements to their reference positions;

measuring axial spacing errors between the reference positions and actual positions of the engraving elements based on the rough positioning;

engraving with the engraving elements a sequence of cups into the rotating printing cylinder, and forming engraving control signals for drive of the engraving elements;

during said engraving, executing with the engraving elements a feed motion along the printing cylinder in the axial direction and with faulty spacings relative to one another caused by the rough positioning; and compensating the axial spacing errors by a shifted engraving of the engraving lanes on the printing cylinder such that the engraving lanes exhibit said predetermined lane widths despite the faulty spacings of the engraving elements relative to one another.

27. An engraving machine for engraving at least two engraving lanes having predetermined lane widths that lie next to one another in an axial direction of a printing cylinder with a respectively allocated engraving element, comprising:

a rotationally seated printing cylinder turned by a first drive;

an engraving carriage movable in the axial direction of the printing cylinder with at least one second drive;

engraving elements for engraving the engraving lanes that are arranged displaceable and lockable on the engraving carriage;

a signal editing unit for generating engraving control signals for the engraving elements;

a position measuring unit for measuring axial spacing errors between predetermined axial reference positions for the engraving elements and actual positions that the engraving elements have in fact assumed given a rough positioning onto the predetermined reference positions; and a compensation unit for compensation of the measured axial spacing errors by a shifted engraving of the engraving lanes on the printing cylinder and by a correspondingly shifted provision of the engraving control signal values for the engraving elements.

28. The engraving machine according to claim 27 wherein the position measuring unit comprises:

a video camera mounted on a measuring carriage for registering a video image of an engraving stylus tip of an engraving element or of a cup engraved as a trial with the engraving element as the actual position of the engraving element; and an image evaluation unit for determining the axial spacing errors between the actual positions of the engraving elements and the predetermined reference positions by evaluating the video image registered by the video camera.

29. The engraving machine according to claim 28 wherein the measuring carriage with the video camera is displaceable in the axial direction of the printing cylinder.

30. The engraving machine according to claim 28 wherein the measuring carriage with the video camera is automatically positioned by a drive onto the predetermined axial reference positions.

31. The engraving machine according to claim 27 wherein a raster computer is provided wherein the engraving data are acquired by interpolation from image data deposited in an image data store; and the compensation unit for compensation of the measured spacing errors is in an interactive connection with the raster computer in order to control the providing of the engraving control signal values for the engraving elements in the shifted engraving of the engraving lanes.

32. An engraving machine for engraving at least two engraving lanes having predetermined lane widths that lie next to one another in an axial direction of a printing cylinder, comprising:

a rotatable printing cylinder;

an engraving carriage movable in the axial direction of the printing cylinder;

engraving elements for engraving the engraving lanes arranged displaceable on the engraving carriage;

a signal editing unit for generating engraving control signals for the engraving elements;

a position measuring unit for measuring axial spacing errors between predetermined axial reference positions for the engraving elements and actual positions that the engraving elements have in fact assumed given a rough positioning onto the predetermined reference positions; and a compensation unit for compensation of the measured axial spacing errors by a shifted engraving of the engraving lanes on the printing cylinder and by a correspondingly shifted provision of the engraving control signal values for the engraving elements.

33. A position measuring unit for an engraving machine for engraving at least two engraving lanes with predetermined lane widths lying next to one another in an axial direction of a printing cylinder with a respectively allocated engraving element that is provided with an engraving control signal, comprising:

a video camera mounted on a measuring carriage in order to register video images of engraving stylus tips of the engraving elements or of the cups engraved as trials with the engraving elements as actual positions of the engraving elements roughly displaced onto predetermined reference positions;

the measuring carriage is displaceable in the axial direction of the printing cylinder and is positioned at the predetermined reference positions for the engraving elements;

an image evaluation unit connected to the video camera is present for evaluating the registered video images in order to determine spacing errors between the reference positions and the actual positions of the engraving elements; and a unit connected to the image evaluation stage to compensate the spacing errors measured by the position measuring unit by a shifted engraving of the engraving lanes on the printing cylinder and by a correspondingly shifted provision of the engraving control signals for the engraving elements.

34. A position measuring unit for an engraving machine for engraving at least two engraving lanes with predetermined lane widths lying next to one another in an axial direction of a printing cylinder with a respectively allocated engraving element provided with an engraving control signal, comprising:

a video camera mounted to register video images of the engraving elements or of cups engraved as trials with the engraving elements as actual positions of the engraving elements roughly displaced onto predetermined reference positions;

the video camera is displaceable in the axial direction of the printing cylinder and is positioned at the predetermined reference positions for the engraving elements;

an image evaluation unit connected to the video camera for evaluating the registered video images in order to determine spacing errors between the reference positions and the actual positions of the engraving elements; and a unit connected to the image evaluation stage to compensate the spacing errors measured by the position measuring unit by a shifted engraving of the engraving lanes on the printing cylinder and by a correspondingly shifted provision of the engraving control signals for the engraving elements.

\* \* \* \* \*